United States Patent [19]

Sloyan et al.

[11] 4,133,508

[45] Jan. 9, 1979

[54] INVERTABLE MOUNT FOR MOTORS

[75] Inventors: Jerome J. Sloyan, Trenton; Anton Kuppek, Pennington, both of N.J.

[73] Assignee: Automatic Motor Base Co., Windsor, N.J.

[21] Appl. No.: 753,833

[22] Filed: Dec. 23, 1976

[51] Int. Cl.² .................... H02K 05/00; F16M 11/04; F16M 3/00

[52] U.S. Cl. .................................. 248/558; 248/657

[58] Field of Search ............................ 248/23, 16, 346

[56] References Cited

U.S. PATENT DOCUMENTS

| | | | |
|---|---|---|---|
| 2,510,680 | 6/1950 | Byrnes | 248/23 |
| 2,934,384 | 4/1960 | Sloyan | 248/23 |
| 3,181,825 | 5/1965 | Jackoboice | 248/16 |
| 3,432,705 | 3/1969 | Lindtveit | 248/16 |
| 3,823,904 | 7/1974 | Stenger | 248/23 |

Primary Examiner—Marion Parsons, Jr
Attorney, Agent, or Firm—Edward F. Connors

[57] ABSTRACT

A motor mount having a slidable carriage bodily invertable by rotating 180° on its longitudinal center line, and having stud-receiving portal openings so arranged and situated in the carriage upper and lower cross-members or surface plates such that with studs therethrough securing the motor to the carriage with the carriage in a certain face upward position, the motor is in an attitude necessarily twisted only to, for instance, the left, and is twisted only to the right with the carriage in a position inverted from the mentioned certain position, the studs utilizing the same portal openings in each of the two positions of the carriage.

4 Claims, 7 Drawing Figures

INVERTABLE MOUNT FOR MOTORS

DRAWINGS

Figure 1:
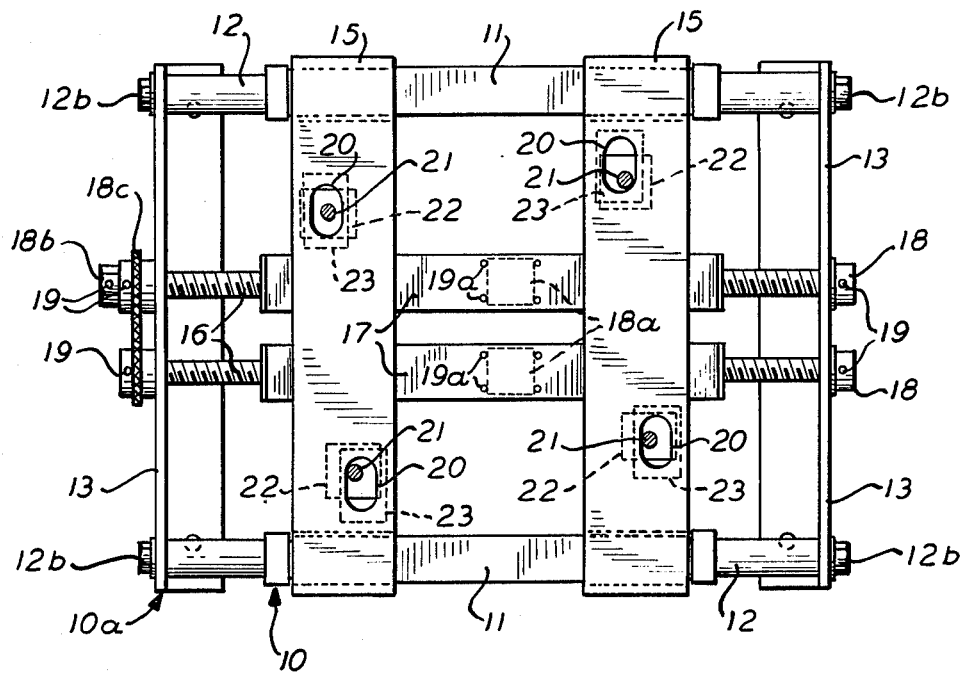
FIG. 1 is a sectional plam taken on a plane coinciding with the under surface of the motor feet, and showing the carriage body in what will arbitrarily be called herein the initial disposition of upwardly located top surface, and showing one set of motor-securing studs as cross-sectioned circles.
Figure 2:
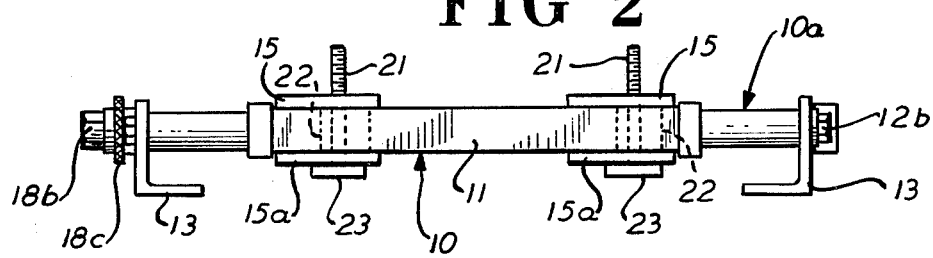
FIG. 2 is a longitudinal edge view of the motor mount of FIG. 1.
Figure 3:
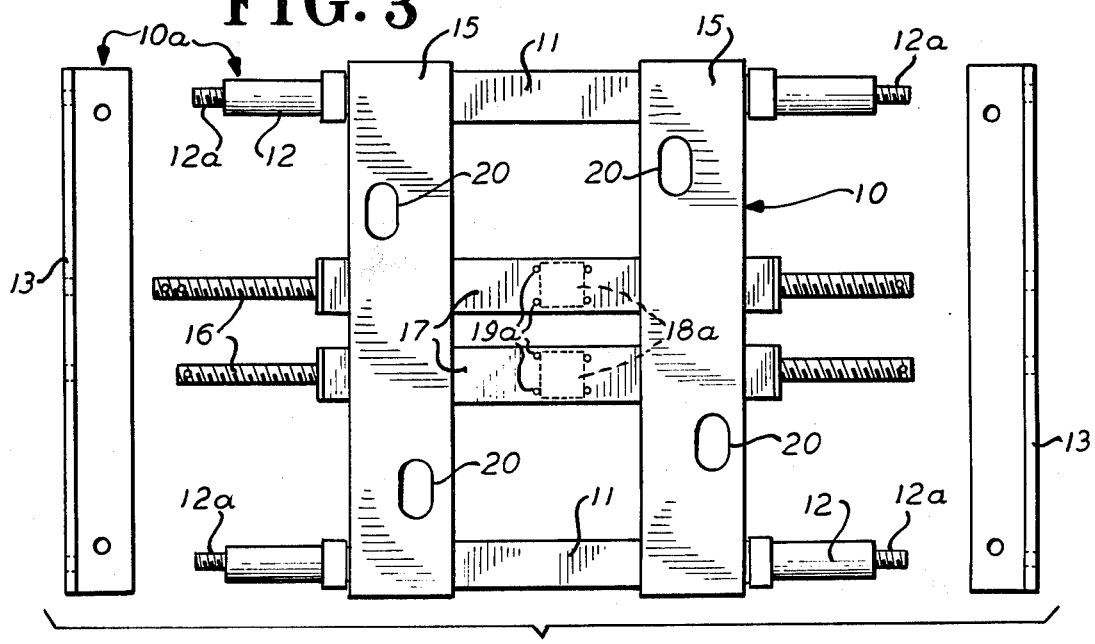
FIG. 3 is a plan of the motor mount corresponding to disposition of the carriage body as in FIG. 1, but with the motor mount partially dis-assembled.
Figure 5:
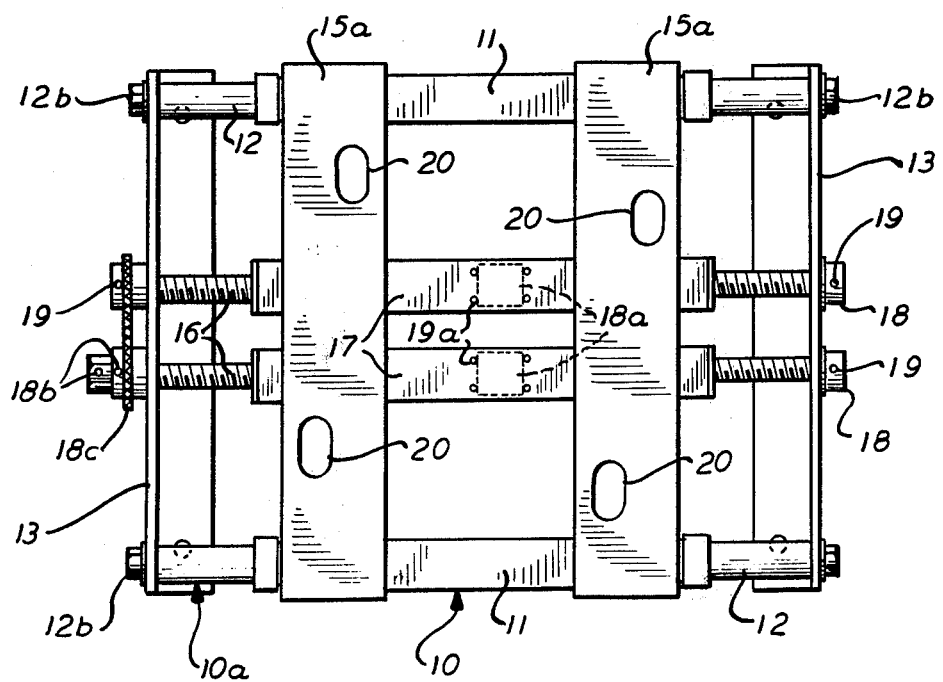
FIG. 5 is a plan of the re-assembled mount with the carriage body in its said inverted disposition of FIG. 4.
Figure 6:
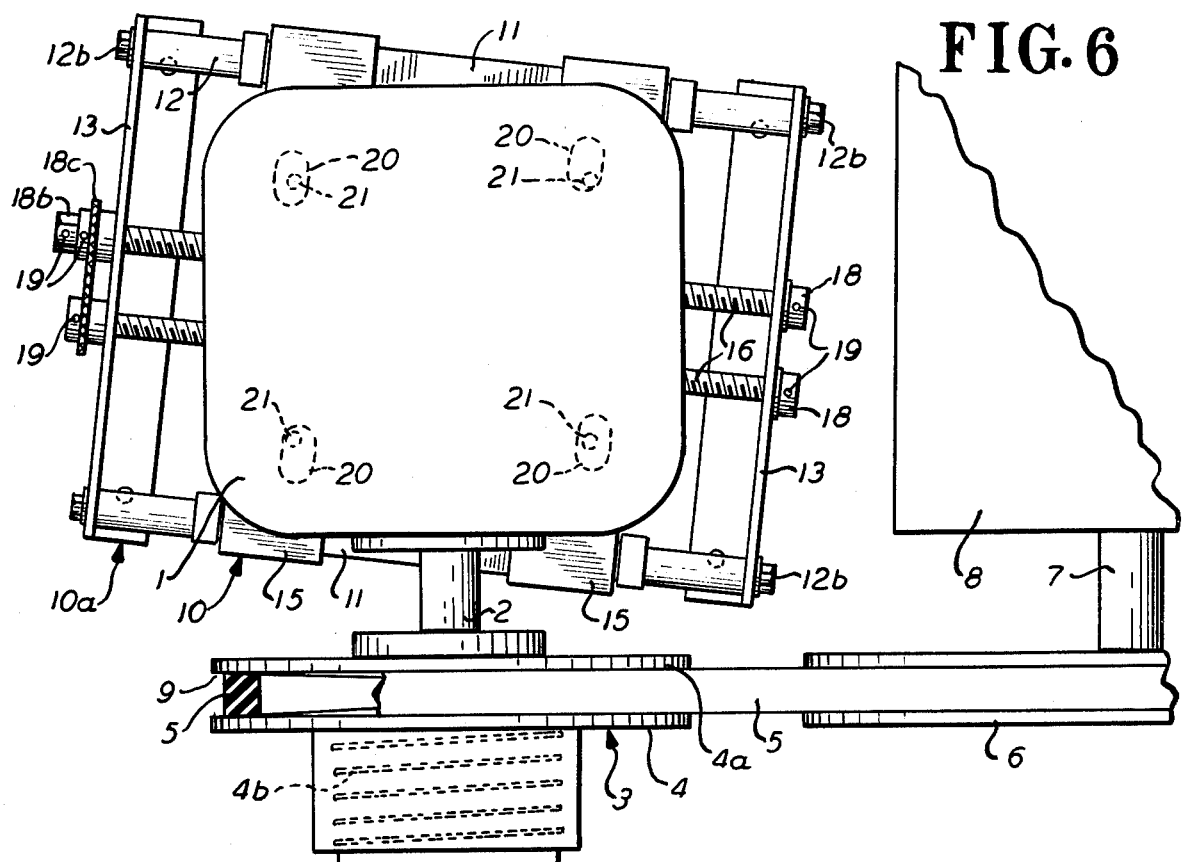
Figure 7:
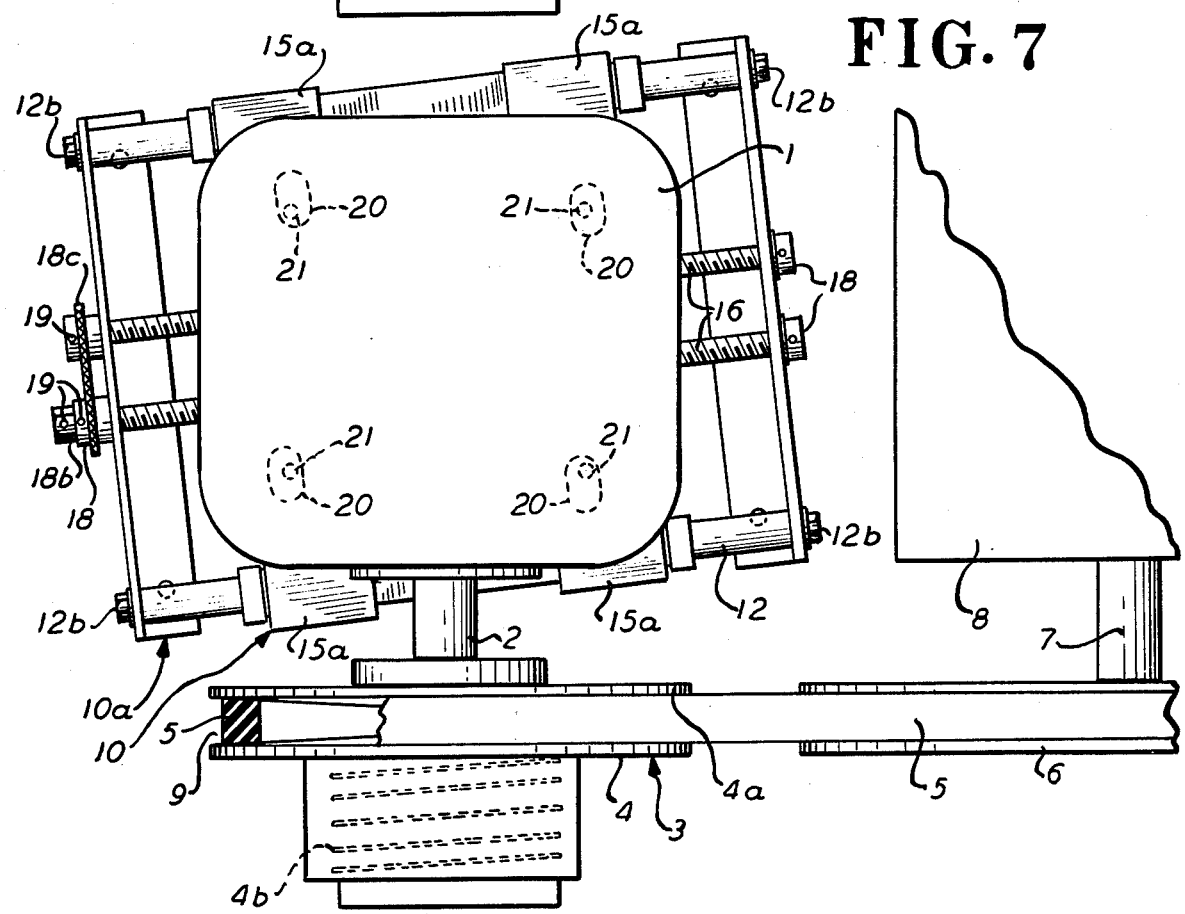

FIG. 6 is a plan corresponding to FIG. 1, but with an electric motor secured in proper twisted or angular attitude to aline the driving pulley with the driven pulley of the driven instrumentality; and FIG. 7 is a corresponding plan showing a motor located on the inverted carriage of FIG. 5 and having a reversely twisted angular attitude to that of FIG. 6 compatable to the portal openings in locations resulting from the inversion of the carriage body.

BASIS OF THE INVENTION

The invention involves a motor mount having a slidable carriage carrying an electric motor secured thereto equipped with a variable pitch pulley having one spring-actuated flange movable toward and away from an axially fixed flange. The motor is secured to the carriage body twisted at an angle with respect thereto, but with its pulley alined with the pulley of the companion actuated instrumentality.

While the invention is usable with the smaller types of motors, it is primarily directed to mounts for the heavier and more powerful types of motors the weight and operating impact of which would produce exceedingly detrimental effects by way of lack of strength or stability of the supporting plates of the carriage such as from being weakened by severe depletion of metal resulting from areas cut out of the plates in provision of contiguous broad double slots per motor foot. For greater reenforcement and rigidity, the present invention employs plates both above and below the glider tubes welded thereto so the said tubes cannot twist or even slightly rotate on the rod-like rails. Perfect unimpaired sliding of the gliders is consequently assured. Furthermore, and essential to the invention, the portal openings are invidually small and yet serve the double purpose of receiving the foot-clamping stud for either the left or right hand angular twist of the motor in the choice of its applied attitude on the carriage.

DESCRIPTION

In the specific embodiment of the invention illustrated in the accompanying drawings, the disclosure involves an electric motor 1 commercially available and may be one of considerable size, weight and power. Like all motors, the one shown has a drive shaft 2, and thereon is a variable pitch driving pulley 3 of known construction provided with flanges 4, 4a which, viewed in their entirety, are parallel to each other, perpendicular to shaft 2 and keyed to it so as to be rotated thereby.

One of the flanges, herein denoted 4, is axially slidable on shaft 2 toward and away from the other or non-slidable flange 4a, and in the present showing the slidable flange 4 is the one most remote from motor 1. The facets of flanges 4, 4a which face toward each other are tapered at a predetermined angle providing a tapered groove 9 therebetween. The slidable flange 4 is urged by a spring 4b in an axial direction toward the companion nonslidable flange 4a, thereby tending to contract groove 9. A V-belt 5 looped in said groove extends therefrom to a grooved driven pulley 6 fast on a driven shaft 7 of a positionally fixed instrumentality 8. Forcing belt 5 deeper in groove 9 of driving pulley 3, will, by virtue of wedging of V-belt 5 against the tapered facets of flanges 4, 4a, cause flange 4 to slide outwardly on shaft 2, the belt also having a lateral outward displacement commensurate with the taper of the facet of the non-slidable flange 4a. This type of variable pitch pulley is well known in art, and its effective use is enhanced by the present invention which, amongst its other benefits, provides improved means for compensating for the lateral displacement of the V-belt just referred to and which unavoidably transpires in operation.

It seems appropriate to now specifically call to attention the fact that the mount and motor are so arranged that the motor pulley will be alined at all times in the same plane with the driven pulley, which is accomplished by causing the motor to move bodily in an axial direction opposite from and to compensate for the lateral displacement of the V-belt so as to thereby keep the center line of the belt constantly in fixed lateral location. This desideratum is accomplished in part by securing the mount in a twisted or angular attitude to the driven instrumentality and in part by securing the motor with an opposite twist or angularity to the mount accomplished by special construction of the mount explained hereinafter.

In general terms, the mount is composed essentially of a fixed part and a movable part. The movable part comprises a slidable carriage 10 which includes at least a pair of cross-sectionally square and parallel glider tubes 11 on opposite sides of a longitudinal center line extending forwardly and rearwardly of the mount. Transverse to and crossing that center line are a plurality of cross members or plates, two of which, 15, 15, lap at their ends crosswise thereon with one plate at the forward ends of the glider tubes and with the other plate next to the rear ends thereof, so that said plates consequently form what is herein termed the initial top surface of the carriage. It is to be understood that the initially upper plates 15, 15 lie in a common plane and are parallel to each other and spaced apart in that plane a distance agreeable to the dimensions of the motor intended to be used, the forward pair of motor feet will be situated on the forward one of said plates 15 and the rearward pair of feet will be situated on the rearward one of said plates 15.

The other or companion members or plates 15a, 15a are located directly under, but spaced from the upper plates 15, 15, that spacing being due to the upper and lower plates respectively projecting over and under the glider tubes. The two said under plates 15a, 15a are welded at their ends to the presently positioned bottom faces of the glider tubes 11 and constitute what we call the initial bottom surface of said carriage. Those under cross-members or plates 15a, 15a are in a plane common to both and are parallel to each other and spaced apart in that plane in conformity with the spacing of the upper plates 15, 15. Each foot of the motor is secured by a respective stud 21 passing through both an upper and companion bottom cross-members or plates 15 and 15a.

Essential to the invention, portal openings 20 are punched or otherwise formed in plates 15 and 15a at predetermined locations nonsymmetrically situated with respect to spacing from respective proximate ends of, and to a selected longitudinal edge of, the plate. One portal opening 20 in each plate is closer to the proximate end of the plate than the distance of the other opening to its proximate end of that plate. Furthermore, for predetermined intended use of the mount with a particular motor of known dimensions, the portal openings can be made simply as round punched or drilled holes properly nonsymmetrically or in other words, positioned at least one on each side of a reference line passing approximately through the center of each plates 15, 15 and 15a, 15a, but accurately situated to receive studs 21 also passing through the motor feet. However for a degree of universality of use with any one of a plurality of motors of slightly different dimensions, the portal openings may each be a slot disposed longitudinally of the plate approximately more or less of a width twice the diameter of the stud anticipated to be used. The slot may also have adequate length to accomodate the stud in several possible locations, but confining the motor to twist in one direction only.

At the manufacturing plant, all of the plates 15 and 15a for use in a single size of carriage are made with the portal openings 20 of duplicate contour and with those of each plate in like position to corresponding ones in the other plates of the set. While all of the plates are applied with corresponding faces directed upwardly, the pair constituted by one upper plate 15 and its companion lower plate 15a (said pair being next to rear ends of glider tubes 11) is swung around 180° so as to extend in a direction opposite from that of the front pair of plates. Thus, while both the front and the rear pairs of plates have openings more proximate to respective plate ends than other portal openings, those more proximate ones, by reversing the rear pair of plates, are at opposite sides and ends of the carriage. Thus, after the carriage is rotated 180° the portal openings in the second motor-supporting surface are positioned in mirror image relationship with respect to the original positioning of the portal openings in the first motor-supporting surface. This arrangement causes the motor to have the desired twist or angular attitude with respect to the carriage when held by studs 21 utilizing those nonsymmetrically situated portal openings 20. With the mount secured to its permanent surface at an angle equal but contra to that of the motor on the carriage, the motor shaft 2 is thereby positioned parallel to the shaft 7 of the driven insrumentality 8.

It may also be mentioned, that as part of the carriage construction, hollow sleeves or spacers 22, having length equal to the thickness of glider tubes 11 are located between and preferably welded upright perpendicular to the upper and lower plates 15 and 15a at locations for the studs 21 to pass through. Those sleeves not only supply reenforcement from the lower plate 15a to the upper one 15 to aid in the support of the motor, but also function to prevent distortion of both plates when tightening the studs. Cleats 23 beneath the lower plate 15a bridging the portal openings 20 receive the studs and transmit the pressure produced thereby to the lower plate and thence to the spacer sleeve 23.

The basal part 10a of the mount includes a pair of headers 13 in parallelism, one at the front end and the other at the rear end of the mount. The headers may conveniently consist of angle irons with one flank of each directed inwardly at the bottom of the mount, and the other flank of each header upstanding at its respective end of the mount. The said inwardly directed flanks are in a common plane and are adapted and intended to be bolted or otherwise retained in use in fixed position on a permanent surface such, for instance, as a floor. Holes are provided near the ends of the upstanding flanks of the headers 13 to receive diametrically reduced threaded ends 12a of rails 12. Said rails are of cylindrical rod-like character and extend from one header to the other and are spaced apart in parallelism agreeable to locations of the glider tubes 11 of the carriage to receive the same slidably thereon. Nuts 12b on said threaded ends 12a of the said rails 12 retain the rails and headers 13 rigidly assembled in use as a unit, but permit disassembly, perhaps during installation, should an opposite twist or angular attitude of motor-to-mount be required, as more fully explained hereinafter.

As is customary with motor mounts, appropriate means are provided for actuating carriage 10 longitudinally of rails 12. In view of the large size of the disclosed mount, a plurality of long operating screws 16 are provided parallel to and between said rails 12, 12 as well as between the upper and lower plates 15 and 15a. Said operating screws 16 project through both headers 13 and there suitably held, as by nuts or collars 18 on ends of the screws where projecting beyond the headers. The nuts or collars may be kept from dislodgement by use of removable transverse pins 19. The screws 16 are each, for a part of their medial lengths, longitudinally within a respective cross-sectionally square housing tube 17 each of which extends between the front and rear pairs of plates 15 and 15a and have welded retention therewith.

Within and substantially fitting against the inner walls of each housing tube 17 is a respective square nut 18a which individually receive, in threaded engagement, the operating screw 16 located in that housing tube. The internal nut 18a in housing tube 17 is held from longitudinal dislodgement by pins 19a passing transversely through the housing tube and making engagement with said nut in front of and behind the same. One of the operating screws 16 may have appropriate means for manual rotation thereof, such as a wrench or crank-receiving nut 18b on its forward end, suitably pinned or otherwise held fast on that screw. The plurality of operating screws 16 are rotated simultaneously in the same directions by sprocket and chain or equivalent interconnection 18c. Rotation of the operating screws 16 in a direction to slide the carriage forwardly, that is, in direction toward the end here shown as having the sprocket and chain interconnection the result of which forces V-belt 5 deeper into groove 9 introducing lateral displacement of the belt which is compensated for by contra bodily movement of the motor in its axial direction instigated by the fixed angular attitudes of the mount and of the motor with respect to the mount. In making an installation, the angular attitudes have to be made to the left or to the right to meet all controlling circumstances, such as which flange of the variable pitch pulley is slidable and/or which end of the motor shaft carries the pulley. Based on an understanding of the above discussed structural features and differing installation requirements, it is now appropriate and opportune to to emphasize that the invention features use of portal openings of restricted size nonsymmetrically located in pairs of upper and lower plates, and that all of said portal openings are utilized no matter which angular attitude, left or right, of the motor on the mount is ultimately adopted.

The particular organization of parts as they appear in FIGS. 1, 2, 3 and 6 shows plates 15, 15 exposed to view at the top of the carriage. In that location of parts, the plates and carriage are arbitrarily referred to as in their initial positions. With the stated location of parts of the carriage 10 in FIG. 6, the motor 1 is attached with its feet juxtaposed on the top surface, namely, on plates 15, 15 of the carriage 10, establishing what may also be called, for purposes of this description, as the initial motor disposition wherein it presents a left-hand twist or angular attitude. By virtue of said portal openings 20 being nonsymmetrical in location in said plates, but symmetrical with respect to holes in the motor feet, use thereof in applying studs 21 to secure the motor, will automatically position the motor in its left-hand twisted or angular attitude herein referred to as its initial disposition and illustrated in the assembly of FIG. 6. Inasmuch as said studs 21 pass through corresponding portal openings 20 in the pairs of upper and lower plates 15 and 15a, all of said portal openings of both plates function jointly in the positioning and retention of the motor, and in addition, the motor is confined thereby to only the left-hand angularity established by location and restricted size of the portal openings.

However, if circumstances require an opposite or right-hand twisted disposition of the motor, the invention provides adaptability for its accomplishment, attained by inverting the carriage 10. By this inversion of the carriage, the former under plates 15a become top plates and constitute the new upper surface against which the feet of the motor are to be juxtaposed after the carriage is reassembled in its new position in the mount. In attaching motor 1 to the reassembled inverted carriage 10, studs 21 are again utilized in all of the portal openings 20 in both sets of plates 15 and 15a securing the feet of the motor juxtaposed to what has become, in the inverted position, the top surface of the carriage, but which in initial disposition was the bottom surface constituted by plates 15a, 15a. The mount with the said inverted csrriage reassembled therewith and having the motor 1 secured in place thereon, is shown in FIG. 7 which illustrates accomplishment of right-hand angular attitude to which the motor is positionally disposed and confined by said studs 21 located in said portal openings 20. It is important to note that the same studs and all of the same portal openings 20 are used both in the initial assembly and in the inverted assembly, but in the first instance attain a left-hand angular disposition of the motor in its relative attitude to the mount, whereas in the second instance attain, instead, an opposite or right-hand angularity or twist of the motor on the carriage by the motor.

Figure 4:
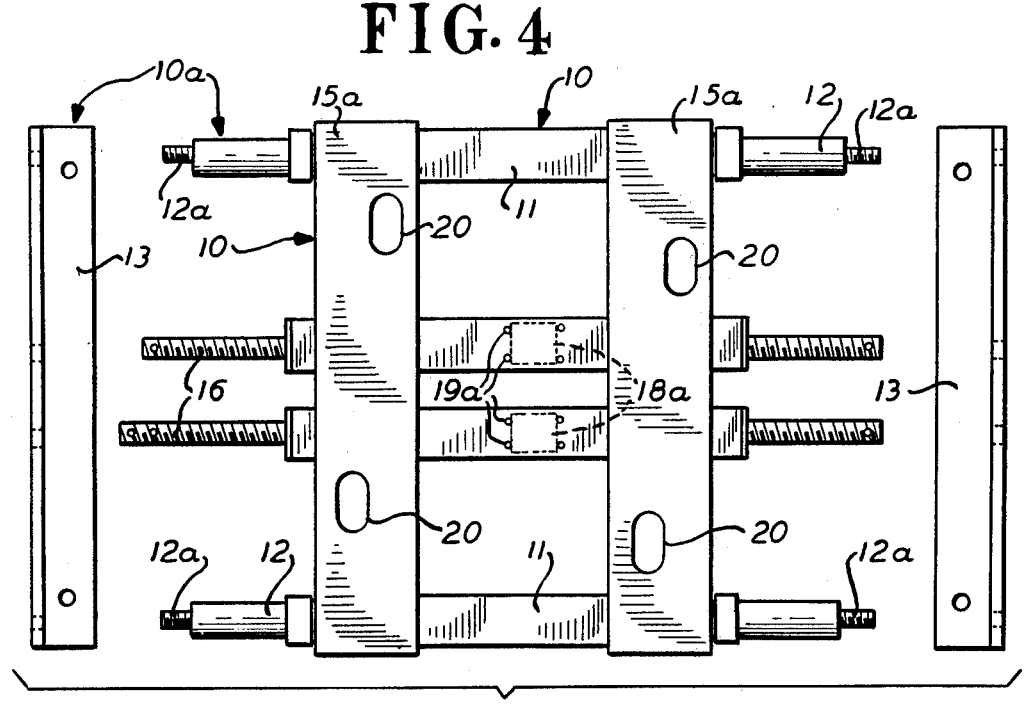
FIG. 4 is a plan of the dis-assembled mount corresponding to FIG. 3; but with the carriage body rotated 180° on its longitudinal center line into what will be termed herein its inverted disposition so that what was its top surface in FIG. 1 has become the bottom surface in FIG. 4.

For effecting the above-mentioned change or reversal from left to right of angularity of the motor, it is called to attention that partial disassembly of the mount is necessary. It is a simple operation to remove the nuts 12b from the ends of rails 12. The pins 19 through operating screws 16 are readily pushed out releasing the associated nuts 18 and sprockets and chain 18c, permitting withdrawal of the headers 13 shown as done in FIG. 3. Thereafter the carriage 10 (with rails 12 and screws 16 optionately included) is inverted by rotation thereof 180° about its longitudinal center line as shown accomplished in FIG. 4. Thereafter the mount is reassembled maintaining the inverted condition of the carriage. In comparing FIGS. 3 and 4, it will be evident that the nonsymmetry of location of the portal openings in FIG. 4 is of reverse order to that of FIG. 3, as a result of which the motor when applied as in FIG. 7 to the reassembled mount, will have the desired right-hand twist. Clamping the motor feet juxtaposed on plates 15a registering with the portal openings will confine the motor to twist in the one direction only.

We claim:

1. A motor mount comprising:
    a slidable invertable carriage having opposing first and second motor-supporting surfaces;
    said first and second motor-supporting surfaces having common portal openings formed therein and passing through the said surfaces for receiving motor-securing studs which are adapted to engage feet of a motor juxtaposed to and registering with said openings;
    said portal openings when passing through said first surface being entirely positioned at least one on each side of an approximate centerline of said first motor-supporting surface, and said portal openings when passing through said second motor-supporting surface being positioned in mirror image relationship with respect to said placement of the portal openings passing through said first motor-supporting surface when said carriage is inverted, whereby the mounting of a motor is at one angular attitude when its feet are juxtaposed on said first motor-supporting surface and at a different angular attitude when its feet are juxtaposed on said second motor-supporting surface.

2. A motor mount in accordance with claim 1, wherein all of said openings are used by said studs in both juxtaposed attitudes occupied by said motor on said surfaces.

3. A motor mount in accordance with claim 1 wherein said angular attitudes are one to the left and one to the right.

4. A motor mount in accordance with claim 1 wherein said portal openings are nonsymmetrical with respect to the carriage and symmetrical with respect to the motor.

* * * * *